(12) United States Patent
Nawarathna et al.

(10) Patent No.: US 8,365,311 B2
(45) Date of Patent: Jan. 29, 2013

(54) QUANTITATIVE ANALYSIS OF MRNA AND PROTEIN EXPRESSION (75) Inventors: Dharmakeerthi Nawarathna, Tustin, CA (US); H. Kumar Wickaramsinghe, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 13/208,170

(22) Filed: Aug. 11, 2011

(65) Prior Publication Data

US 2012/0131703 A1 May 24, 2012

Related U.S. Application Data (60) Provisional application No. 61/402,326, filed on Aug. 27, 2010.

(51) Int. Cl.
*G01Q 60/24* (2010.01)
*G01Q 70/08* (2010.01)

(52) U.S. Cl. ............. 850/61; 850/33; 850/56; 977/943; 977/947; 977/953; 977/958

(58) Field of Classification Search ............. 850/21, 850/33, 52, 56, 58, 59, 61–63; 977/902, 977/943, 947, 953, 958, 963
See application file for complete search history.

(56) References Cited

U.S. PATENT DOCUMENTS

| | | | | |
|---|---|---|---|---|
| 7,735,147 | B2* | 6/2010 | Jin et al. .......................... | 850/21 |
| 7,917,966 | B2* | 3/2011 | Kim et al. ....................... | 850/58 |
| 8,245,318 | B2* | 8/2012 | Jin et al. .......................... | 850/58 |
| 2004/0154744 | A1* | 8/2004 | Kaito et al. ............... | 156/345.24 |
| 2005/0126913 | A1* | 6/2005 | Burke et al. .................. | 204/547 |
| 2008/0272299 | A1* | 11/2008 | Jin et al. ......................... | 250/310 |
| 2010/0005553 | A1* | 1/2010 | Jin et al. .......................... | 850/58 |
| 2010/0055349 | A1* | 3/2010 | Gaitas et al. .................. | 427/580 |
| 2012/0015755 | A1* | 1/2012 | Hanley .......................... | 473/227 |
| 2012/0108470 | A1* | 5/2012 | Oh et al. ........................ | 506/39 |

\* cited by examiner

*Primary Examiner* — Bernard E Souw
(74) *Attorney, Agent, or Firm* — Berliner & Associates (57) ABSTRACT

Provided is a highly selective and non-destructive method and apparatus for the measurement of one or more target molecules within a target environment. The apparatus comprises of a modified AFM (atomic force microscope) tip to create a tapered nanoscale co-axial cable, and wherein the application of an alternating potential between the inner and outer electrodes of the co-axial cable creates a dielectrophoretic force for attracting molecules toward the tip-end which is pretreated with one or more specific ligands.

11 Claims, 5 Drawing Sheets (a) AFM Tip Modification
(b) Extraction of molecules by DEP force
(c) Selective mRNA Hybridization
(d) mRNA extraction
(e) mRNA collection
(f) Quantification

SEQUENCE LISTING

```
<160> NUMBER OF SEQ ID NOS: 9

<210> SEQ ID NO 1
<211> LENGTH: 24
<212> TYPE: DNA
<213> ORGANISM: Artificial
<220> FEATURE:
<223> OTHER INFORMATION: PCR primers

<400> SEQUENCE: 1
agagaagctg tgctatgttg ccct                                               24

<210> SEQ ID NO 2
<211> LENGTH: 24
<212> TYPE: DNA
<213> ORGANISM: Artificial
<220> FEATURE:
<223> OTHER INFORMATION: PCR primer

<400> SEQUENCE: 2
accgctcatt gccgatagtg atga                                               24

<210> SEQ ID NO 3
<211> LENGTH: 24
<212> TYPE: DNA
<213> ORGANISM: artificial
<220> FEATURE:
<223> OTHER INFORMATION: PCR primer

<400> SEQUENCE: 3
accgctcatt gccgatagtg atga                                               24

<210> SEQ ID NO 4
<211> LENGTH: 24
<212> TYPE: DNA
<213> ORGANISM: artificial
<220> FEATURE:
<223> OTHER INFORMATION: pcr primer

<400> SEQUENCE: 4
tgactctacc cacggcaagt tcaa                                               24

<210> SEQ ID NO 5
<211> LENGTH: 24
<212> TYPE: DNA
<213> ORGANISM: artificial
<220> FEATURE:
<223> OTHER INFORMATION: PCR primer

<400> SEQUENCE: 5
acgacatact cagcaccagc atca                                               24
```

-continued

```
<210> SEQ ID NO 6
<211> LENGTH: 24
<212> TYPE: DNA
<213> ORGANISM: artificial
<220> FEATURE:
<223> OTHER INFORMATION: PCR primer

<400> SEQUENCE: 6
tgactctacc cacggcaagt tcaa                                          24

<210> SEQ ID NO 7
<211> LENGTH: 24
<212> TYPE: DNA
<213> ORGANISM: Artificial
<220> FEATURE:
<223> OTHER INFORMATION: PCR primer

<400> SEQUENCE: 7
aagagtcctg ttgatgtggc cagt                                          24

<210> SEQ ID NO 8
<211> LENGTH: 24
<212> TYPE: DNA
<213> ORGANISM: artificial
<220> FEATURE:
<223> OTHER INFORMATION: PCR primer

<400> SEQUENCE: 8
ctgcctacag gctcatagtg caaa                                          24

<210> SEQ ID NO 9
<211> LENGTH: 24
<212> TYPE: DNA
<213> ORGANISM: artificial
<220> FEATURE:
<223> OTHER INFORMATION: PCR primer

<400> SEQUENCE: 9
ctgcctacag gctcatagtg caaa                                          24
```

QUANTITATIVE ANALYSIS OF MRNA AND PROTEIN EXPRESSION

CROSS-REFERENCE TO RELATED APPLICATIONS

This application claims the benefit of U.S. Provisional Patent Application No. 61/402,326 filed Aug. 27, 2010, which is hereby incorporated by reference in its entirety.

REFERENCE TO SEQUENCE LISTING

A Sequence Listing is submitted as an ASCII text file, named 1279517.txt, created on Jan. 30, 2012, size 1.74 Kb, which is incorporated by reference herein.

FIELD OF THE INVENTION

The invention relates to microscopy. More particularly this invention relates to the use of atomic force microscopy for detection of mRNA and protein.

BACKGROUND

AFM probe tips have been used for injecting[1] and manipulating[2,3,4,5]. However, as far as we know, no one has used such tips to selectively extract and quantify biomolecules (for instance, mRNA or proteins) within living cells, or to measure them in other buffered solutions.

SUMMARY

In the first embodiment, an atomic force microscope based apparatus is provided comprising a cantilever/tip assembly modified to receive one or more ligands and to deliver an AC electric field, whereby the electric field results in the attraction of one or more target molecules to the ligand.

In a more particular embodiment of the first embodiment, the ligands are selected from a group consisting of RNA, DNA, and protein.

In a particular embodiment of the first embodiment, the electric field generates a dielectrophoretic force.

In a second embodiment of the invention, a method for detection of target molecules within a target environment is provided, comprising inserting a cantilever into a target environment, and applying an AC electric field in the cantilever/tip assembly.

In a particular embodiment of the second embodiment, the target environment is the cell cytoplasm, nucleus, plasma membrane, cell surface membrane, cytoplasmic organelles/structures; blood, plasma, serum, whole tissue, or a buffered solution.

In yet another particularized embodiment of the second embodiment, the cantilever/tip assembly is coated with one or more ligands selected from the group consisting of RNA, DNA, and protein.

In another particular embodiment of the first and second embodiments, a living cell is the target environment, and the cell is still living during insertion and removal of the cantilever.

BRIEF DESCRIPTION OF DRAWINGS

FIG. 3 shows capturing High (~2500), medium high (1500) to extremely low copy number (~10) mRNA. (a) β-actin mRNA was extracted and quantified using a SYBR green assay. Figure indicates the fluorescence vs. cycle number for the two separate experiments—one with the electric field on and one with the field off. (b) Melt curve analysis of the samples used in (a); a single peak appeared indicating that no primer-dimer was formed. Inset shows the gel electrophoresis image of the sample that was used in our qPCR experiments. A 121 bp band of β-actin was observed in a 100 bp ladder. (c) Extraction of medium high (GAPDH) to extremely rare mRNA (HPRT). For GAPDH and HPRT, 10 fold dilutions of cDNA were prepared and used for qPCR analysis. Figure shows the fluorescence vs cycle number for 10 fold dilutions of GAPDH and HPRT. (d) Melt curve analysis for HPRT; a single peak was observed. Inset shows the image of the gel electrophoresis experiment; a single band of 166 bp was observed in a 100 bp ladder.

DETAILED DESCRIPTION

Provided is a method for extracting very low and high copy number mRNA and protein expression within a living cell with high-throughput. The technique is based on the use of a dielectrophoretic force for attracting RNA/protein molecules toward the end of a sharp AFM probe tip in order to affinity bind them to the probe tip.

For our initial experiments on mRNA extraction and quantification, we integrated the dielectrophoretic nano-tweezer (DENT) at the end of an AFM probe tip. It gives us the flexibility to extract mRNA from within specific compartments of that same cell—in the present study the nucleus of the cell. The DENT can be viewed essentially as a nanoscale, tapered, co-axial cable integrated into an AFM probe tip. The application of an AC electric field between the inner and outer electrodes of the DENT creates a large electric field gradient at the end of the probe resulting in a dielectrophoretic attractive force on the mRNA molecules. Selective mRNA extraction was achieved by combing the positive dielectrophoretic force which attracts mRNA molecules toward the probe tip with chemical derivatization of the probe surface—using gene specific oligonucleotide primers—tailored to hybridize the specific target mRNA's of interest. Unlike conventional mRNA binding experiments (and other ligand binding experiments) performed without the use of such AC electric fields, there is no need to wait 30 or more minutes (sometimes overnight incubations) in order to reach equilibrium binding conditions. Accordingly, maximum sensitivity can be achieved in less than 1 minute.

Figure 2:
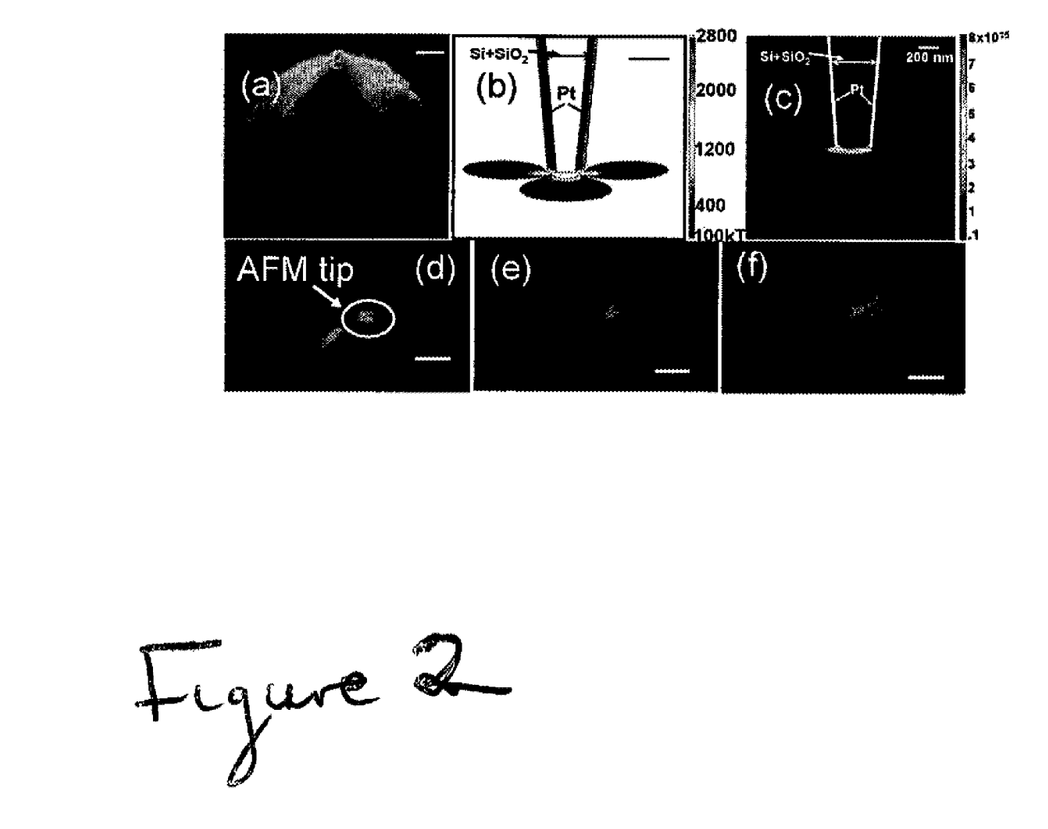
FIG. 2 shows (a) Scanning electron microscope image of the structurally modified tip (top view); the electric field is applied between the outside metal layer (20 nm thick Pt) and the inner doped Si. (b) 2-D finite element simulation (Comsol AB) showing the capture range for molecules of different thermal energy (in units of kT). (c) Shows the calculated electric field gradient. (d, e and f) Time lapse image showing the attraction of Cy5 labeled BSA molecules in 1×PBS solution. Scale bars indicate 200 nm.

The DENTs were built using commercially available conical, highly doped (resistivity 4-6 ohm-cm) silicon AFM probes (k~1.5N/m). We start by growing a 20 nm thick layer of SiO2 on the AFM probes using a conventional oxidation furnace. This serves to electrically insulate the entire silicon probe including the AFM cantilever and handling chip. In the second step, we e-beam evaporate a 10 nm Ti adhesion layer followed by a 20 nm film of Pt onto the side of the cantilever that contains the probe tip. In the final step, we carefully polish the end of the Pt coated tip until the doped silicon tip is just exposed. The last step was performed by scanning the tip in contact with a flat sapphire surface for about 5 min using a loading force of $7.5 \times 10^{-7}$ N in the AFM setup. FIG. 2(a) shows the scanning electron micrograph of the tip (top view) in its final form.

Figure 1:
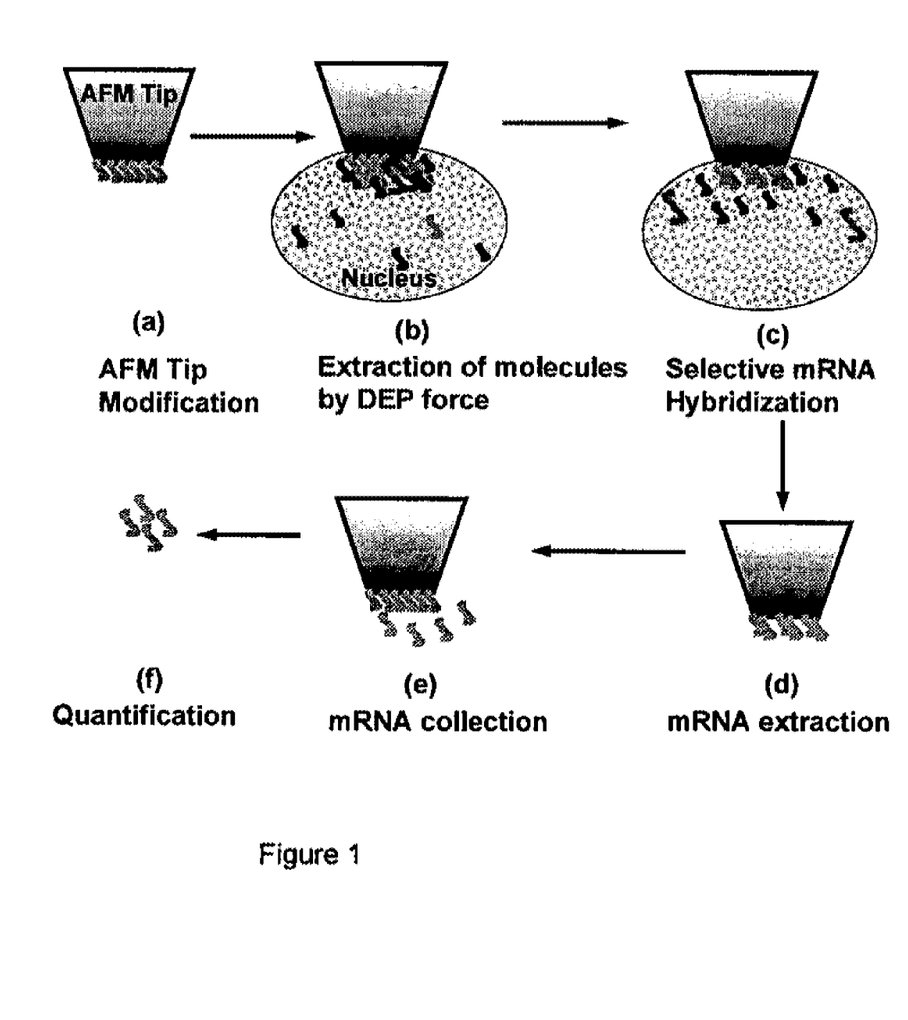
FIG. 1: Shows a schematic of the one embodiment of the method disclosed where (a) The AFM tip was modified structurally and chemically to accommodate gene specific primers. (b) The tip was inserted into the nucleus of a single cell and an AC electric field was applied to create a positive DEP attractive force on the mRNA molecules (c) Target mRNA's are hybridized on the AFM tip surface. (d) After hybridization the AC field is tuned off and the tip is withdrawn from the cell (e) The tip is immersed in DI water to melt the hybridized mRNA. (f) Extracted mRNA is quantified using qPCR and gel electrophoresis.

The chemical modification of the probe surface was achieved by immobilizing gene specific primers complementary to the mRNA of interest. This was done using standard biotin-streptavidin chemistry[6]. First the cantilevers were cleaned using solvents and for 5 mins air dried. Next, the samples were transferred to a UV chamber and irradiated for 60-75 mins. A mixture of 5% (APTES, aminopropyltriethoxysilane) in ethanol was prepared and the cantilever/tip assemblies were immersed in the APTES solution for 3 hours, then washed in 100% Ethanol solution and air dried. The cantilever/tip assemblies were then incubated with 10 mM of EZ-Link Sulfo-NHS-LC-Biotin (sulfosuccinimidyl-6[biotin-amido]hexanoate) from Pierce, Rockford, Ill., USA) for about 45-60 mins at room temperature. The Biotinated cantilever/tip assemblies were then incubated with 100 mM Streptavidin (Sigma, St. Louis, Mo., USA) solution for about 60-75 mins at room temperature. After incubation, the cantilever/tip assemblies were washed with 1× Phosphate Buffered Solution (pH 7.4, Fisher, Pittsburgh, Pa., USA). Finally the cantilever/tip assemblies were incubated with the appropriated biotinilated ssDNA (single strand deoxyribonucleic acid) primers for specific mRNA capture. The incubation was done at 4° C. overnight and then washed with 1×TAE (tris-acetate-EDTA) buffer (Sigma, St. Louis, Mo., USA). The substrates are now ready for mRNA extraction.

mRNA expression experiments were performed by inserting the modified AFM probes into the nucleus of the cell, via microscopic manipulation, applying a 120 KHz, 5V pp ac voltage signal across the inner and outer electrodes of the DENT for a duration of 60-75 seconds, extracting the probe tip with the captured mRNA, melting the captured mRNA and finally analyzing it using gel electrophoresis or qPCR (quantitative polymerase chain reaction). FIG. 1 illustrates the complete sequence.

Single cell mRNA expression experiments were performed using rat fibroblast cells (*Rattus norvegicus*) and cultured following the procedures described in ref[4]. Three mRNA populations were analyzed; a 125 bp portion of β-actin [forward primer SEQ. ID. NO. 1: 5'-AGA GAA GCT GTG CTA TGT TGC CCT-3' and β-actin reverse primer SEQ. ID. NO. 2: 5'-ACC GCT CAT TGC CGA TAG TGA TGA-3'. SEQ. ID. NO. 3: Biotinilated 5'-/5Biosg/ACC GCT CAT TGC CGA TAG TGA TGA-3' DNA was attached to the Si substrate as the mRNA binding primer.], a 141 bp portion of GAPDH [forward primer SEQ. ID. NO. 4: 5'-TGA CTC TAC CCA CGG CAA GTT CAA-3' and reverse primer SEQ. ID. NO. 5: 5'-ACG ACA TAC TCA GCA CCA GCA TCA-3'. SEQ. ID. NO. 6: Biotinilated 5'-/5Biosg/TGA CTC TAC CCA CGG CAA GTT CAA-3' DNA was attached to the Si substrate as the mRNA binding primer.] and a 166 bp portion of HPRT [forward primer SEQ. ID. NO. 7: 5'-AAG AGT CCT GTT GAT GTG GCC AGT-3' and reverse primer SEQ. ID. NO. 8: 5'-CTG CCT ACA GGC TCA TAG TGC AAA-3'. SEQ. ID. NO. 9: Biotinilated 5'-/5Biosg/CTG CCT ACA GGC TCA TAG TGC AAA-3' DNA was attached to the Si substrate as the mRNA binding primer.].

The experiments were performed as follows. AFM tips were prepared and the appropriate ssDNA-mRNA binding primers corresponding to the mRNA to be extracted. The rat fibroblast cells were cultured on regular glass microscope slides (2×2 cm). The AFM tip was moved to a randomly selected cell on the glass slide; it was operated in the contact (or repulsive) mode so that contact with the cell membrane could be easily detected through a change in cantilever deflection amplitude. Once contact was established, a short voltage pulse was applied to the z-piezo in order to penetrate the cell membrane. A similar procedure was followed for penetrating the nuclear membrane. Once the probe was inserted into the nucleus, 1 ms duration, 120 KHz, 5V pp voltage bursts at 50% duty cycle were applied across the inner and outer electrodes of the DENT. This facilitates many encounters of the target molecules with the probe surface. After 60-75 secs, the AC voltage was turned off and the tip was removed from the cell. The entire tip was then immersed in DI water in ice for 45 mins in order to release the captured mRNA into solution. The iScript cDNA Synthesis Kit (Bio RAD, Hercules, Calif., USA) was used to make cDNA (complementary deoxyribonucleic acid) from the isolated mRNA molecules. Finally, the cDNA was used to perform qPCR analysis of the samples. cDNA preparation was done according to the instructions of iScript cDNA synthesis kit. For real-time qPCR cycling, SYBR green was used as the probe in the Chromo4 qPCR system from BioRAD. The following thermal cycling protocol was used: 40 cycles of 94° C. for 15 sec, 57° C. for 30 sec and 72° C. for 45 sec for each mRNA. A melt curve was generated by increasing the temperature from 45° C. to 95° C. and holding for 30 secs after each 1 degree temperature change. The qPCR products were visualized by Ethidium Bromide on 2% agarose gels.

In order to gain a better understanding of the parameters for molecular extraction using the dielectrophoretic force probe, we performed a series of 2-D field and force calculations using finite element analysis (comsol AB). We first computed the potential distribution by solving the 2-D electrostatic problem. The outer Pt layer of the tip was kept at ground potential while the inside Si probe was kept at 10V. The electric fields and their gradients were then derived from the calculated potential distributions. In order to estimate the capture range involved during mRNA extraction, we applied the condition that molecules satisfying $$\frac{\alpha E^2}{2} \geq kT$$

will be attracted toward the probe tip. Here, α is the dielectric polarizability of the mRNA molecules, E is the applied electric field, k is Boltzmann constant and T is the absolute temperature of the surrounding medium. FIG. 2(b) illustrates the capture range at T=300K for the more stringent condition where $$\left(\frac{\alpha E^2}{2} - kT\right) \geq 100kT$$

for 2000 base length mRNA molecules within the cell (approximate value for $\alpha = 8.94 \times 10^{-30}$). FIG. 2(c) shows ($\nabla|E|^2$) with the DENT inserted within the cell. A large gradient is present at the end of the probe as expected. Since the dielectrophoretic force on any charged particle is given by $$\vec{F} = \left(\frac{v\alpha}{2}\right)\vec{\nabla}|E|^{2^7}$$

where v is the volume of the particle, $\alpha$ is the polarizability and E is the external applied electric field, we note that mRNA molecules are preferentially attracted toward regions of high ($\nabla|E|^2$)—i.e toward the interface between the Si and SiO2 in our case as illustrated in FIG. 2(c).

Our initial experiments were focused on attracting fluorescently (Cy5) labeled Bovine Serum Albumin (BSA) molecules. The probe was immersed in a solution of BSA molecules, an AC voltage (5V pp at 120 KHz) was applied across the tweezer electrodes and the inner Si and observed in real time using an Olympus fluorescence confocal microscope. FIG. 2(d,e&f) shows time sequence of fluorescence images following the application of the AC voltage. We clearly observe BSA molecules being attracted toward the highest gradient regions of the probe tip as a function of time.

Figure 3:
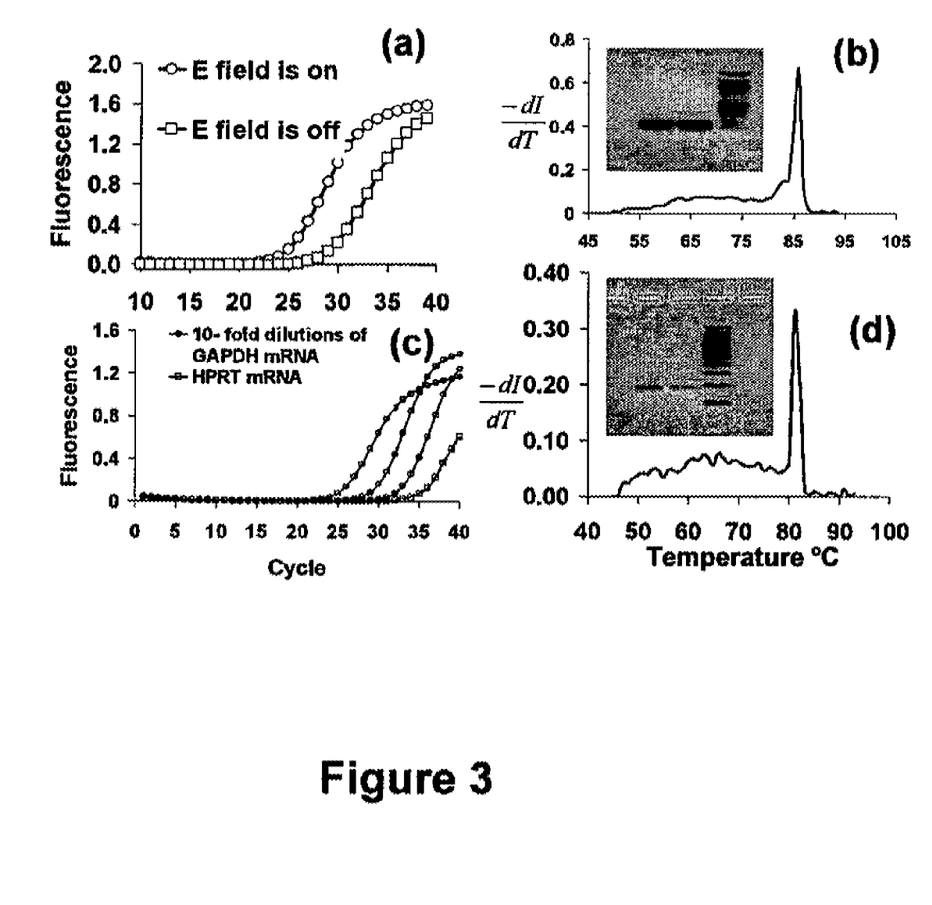

In our first series of experiments we extracted β-actin mRNA from a single living cell. The DENT tips were chemically modified. As described earlier, the cells were grown on microscope slides, mRNA extracted and cDNA generated followed by the qPCR quantification reaction. FIG. 3(a) shows the fluorescence intensity of the sample as a function of cycle number. We performed two separate sets of experiments. In the first set we applied the AC electric voltage pulse sequence as described earlier. A detectable fluorescence intensity was consistently observed after the 20$^{th}$ cycle and leveled off after the 35$^{th}$ cycle. The second set of experiments was performed without the application of the AC electric voltage pulse sequence. A detectable fluorescence intensity was observed only after the 26$^{th}$ cycle (see FIG. 3(a)). From these results we conclude that the application of the AC electric voltage pulse sequence increases the molecular collection efficiency by approximately 100 fold. To verify that we are indeed detecting β-actin mRNA, we performed both a melt curve analysis and gel electrophoresis. FIG. 3 (b) shows the melt curve. Note that a single peak was observed as expected. The inset shows the gel electrophoresis analysis; note that one β-actin band at about 125 bp (between the 100 and 200 bp) was observed for both samples.

We also performed similar experiments where a cw voltage of 5V pp at 120 KHz was applied across the tweezer electrodes instead of a pulse sequence in order to collect the mRNA molecules of interest. Although one might expect that many repeated encounters with the chemically modified probe surface would increase the collection efficiency of a specific target mRNA, surprisingly, we obtained similar collection efficiencies in both cases. This is probably due to the fact that our current probes have large enough surface area to attract and sample a range of mRNA molecules from within the nucleus without masking the surface and preventing the hybridization of the target molecules. All subsequent experiments were therefore performed using a cw voltage across the DENT.

In the second and third series of experiments, we explored the validity and limits of our technique by extracting GAPDH and HPRT mRNA respectively. In these experiments, we made 10 fold dilutions of the cDNA and used it for qPCR analysis. FIG. 3(c) shows the results. We observed equally spaced fluroscence vs. cycle plots for GAPDH as expected. For HPRT however, detectable florescence was only observed at the highest concentration level of cDNA. FIG. 3(d) shows the melt curve and gel electrophoresis analysis of the samples that contained HPRT. A single peak was observed in the melt curve as expected. Gel electrophoresis showed a 166 bp HPRT band. After each experiment, cell viability was confirmed using the standard Trypan blue test.

As can be appreciated, the target molecules within the target environments can be mRNA, DNA, proteins, lipids or any combination thereof. Accordingly, one or more different type of ligands can be used on a single cantilever/assembly tip for this purpose.

Figure 4:
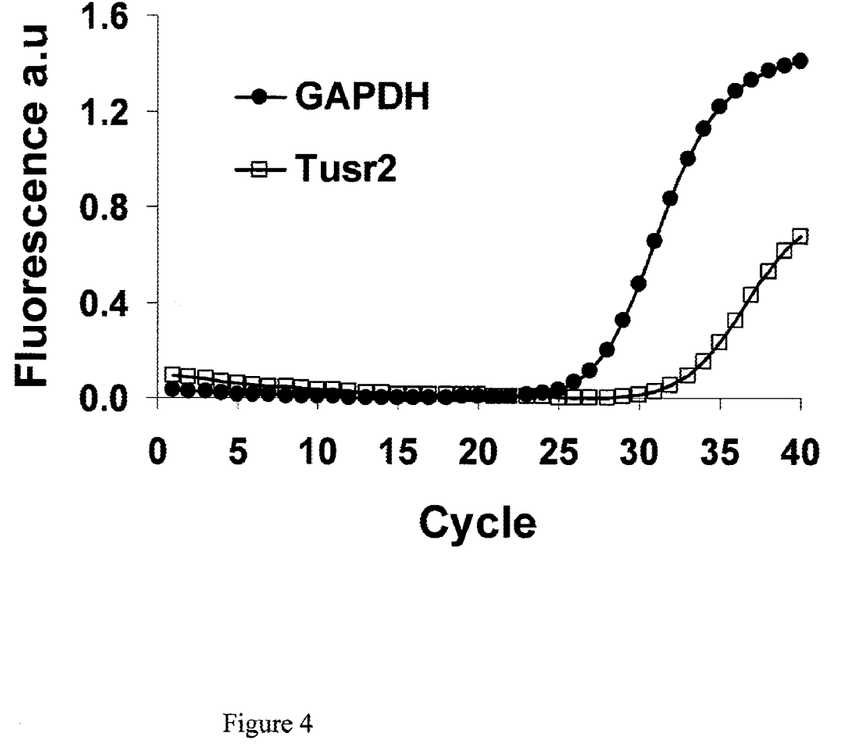
FIG. 4 shows fluorescence graph of results obtained using two different ligands to detect two different target molecules using a single cantilever/tip assembly.

Unexpectedly, our experiments using a mixture of two different probes to coat the cantilever successfully show that the method is still able to retain both specificity and sensitivity. Accordingly, the use of multiple probes on a single cantilever allows investigators to detect multiple mRNA targets in the nucleus of a single cell at the same time (see FIG. 4).

Figure 5:
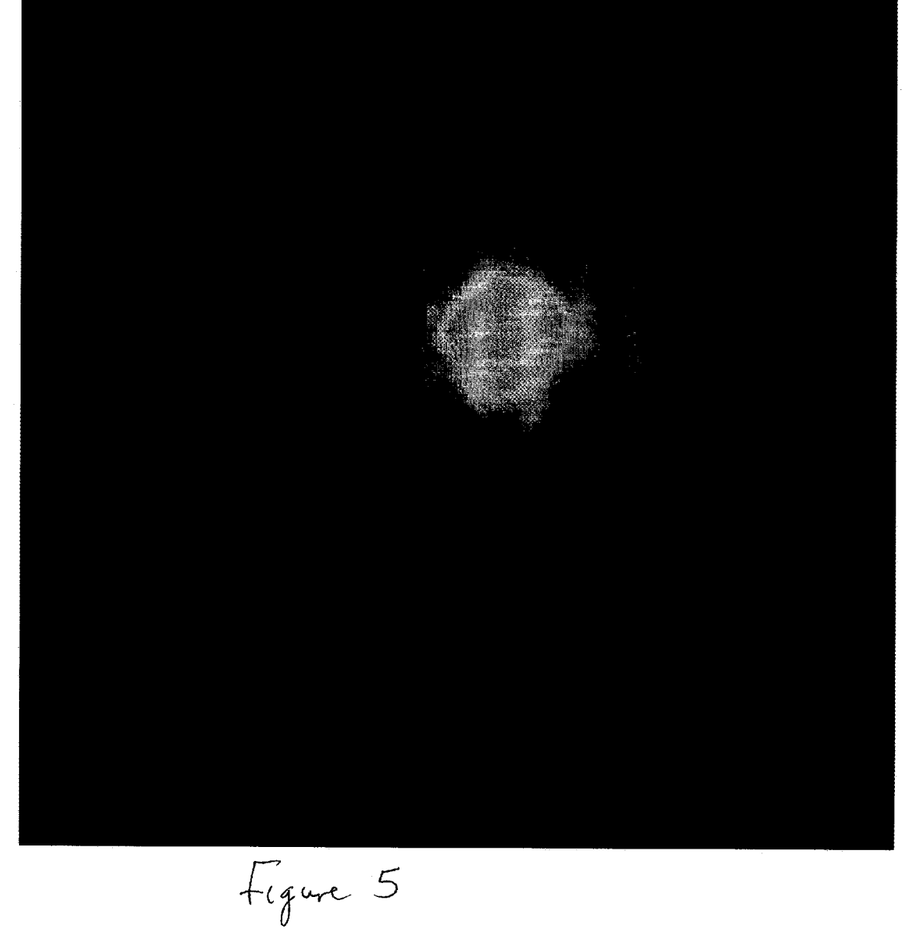
FIG. 5 shows a plan view of ligand modified AFM tip showing BSA antigen/antibody binding concentrated at tip end; tip base diameter is 2 micron.

In other sets of experiments, we were also able to demonstrate that the cantilevers could be coated with specific monoclonal antibodies and such cantilevers used to probe cells. In this embodiment, one or more than one monoclonal antibody type could be used to coat each cantilever. Accordingly, the method is adaptable so that it can be used with ligands, other than monoclonals, as well as catalytic molecules. Here, FIG. 5 shows a plan view of ligand modified AFM tip showing BSA antigen/antibody binding concentrated at tip end; tip base diameter is 2 micron.

This method, whether the cantilever/assembly tip is modified with RNA, monoclonal antibodies or other ligands, will be applicable in large screening formats, such as an Eliza or Chip assays, to detect specific targets of interest in target environments such as tissues, cells or blood (whole, serum or plasma), cell nucleus, cell cytoplasm, or buffered solutions. Here, it is possible to use just electrodes/probes as the cantilever/tip assembly, with a voltage applied to them, without any accompanying microscope. Individual electrodes can either be inserted either into individual micro-wells or one or more electrode inserted into one large well; or any combination thereof.

In summary, we have demonstrated a technique for the extraction and analysis of a range of mRNA and proteins in target environments, such as living cells. As compared with other technologies[9,10,11], the approach presented here is highly specific to the type of target molecule being analyzed and therefore is much more sensitive. It is fast, simple and non-destructive and does not require cell lysing, purification of mRNA from the contaminants. Our technique would enable one to monitor one or more target molecule expression within a single cell as a function of time in response to various stimuli. We believe that the technique will have a myriad of application areas ranging from systems biology to cancer research.

REFERENCES

Which are Hereby Incorporated by Reference in their Entirety

1. Nawarathna, D., Unal K. and Wickramasinghe H. K. *Applied physics letters*. 93(15): 153111-3, 2008

2. Unal, K., Frommer J., and Wicramasinghe H. K, 88:183105-3, 2006
3. Mario, V. B., Pietransanta L. I., Thompson J. B., Chand A., Gebeshuber L. C., Kindt J. H., Richter M., Hansma H. G. and Hansma P. K, *Nature structural biology.* 7(8): 644-647, 2000.
4. Osada T., Hironori U., Hyonchol K. and Atsushi I., *Journal of Nanobiotechnology.* 1(2): 1-8, 2003
5. Uehara, H., Kunitomi Y., Ikai A. and Osada T. *Journal of Nanotechnology.* 5(7): 1-6, 2007
6. Barbany, G., Hagberg A., Waldenström E. and Landegren U., *Biomolecular Engineering* 16: 105-111, 1999.
7. Pohl, H. A. *Electrochemical Society.* 155C-161C, 1968.
8. Ajdari A. and Prost J., *Proc. Natl. Acad. Sci USA,* 88: 4468-4471, 1991
9. Nolan, T., Hands R. E., and Bustin S. A. *Nature protocols.* 1(3): 1561-1582, 2006.
10. Eberwine, J. H. Yeh, K. Miyashiro, Y. Cao, S. Nair, R. Funnell, M. Zettel and P. Coleman. *Proc. Natl. Acad. Sci. USA* 89(7): 3010-3014, 1992.
11. Marcus, J. S., Anderson W. F, and Quake S. R. *Anal. Chem.* 78:3084-3089, 2006.

The invention claimed is:

1. An atomic force microscope based apparatus comprising:
 a cantilever/tip assembly modified to receive one or more types of ligands and to deliver an AC electric field, whereby the electric field results in the attraction of one or more target molecules to the one or more types of ligands.

2. The microscope of claim 1, wherein the one or more types of ligands is selected from a group consisting of RNA, DNA, and protein.

3. The microscope of claim 2, wherein the protein is a monoclonal or polyclonal antibody.

4. The microscope of claim 2, wherein multiple ligand types are attached to the cantilever/tip assembly.

5. The microscope of claim 1, wherein the electric field generates a dielectrophoretic force.

6. A method for detection of one or more target molecules within a target environment, comprising:
 inserting a cantilever/tip assembly into a target environment, and
 applying an AC electric field in the cantilever/tip assembly.

7. The method of claim 6, wherein the target environment is the cell cytoplasm, nucleus, plasma membrane, cell surface membrane, cytoplasmic organelles/structures; blood, plasma, serum; whole tissue, or a buffered solution.

8. The method of claim 6, wherein the cantilever/tip assembly is coated with one or more types of ligands.

9. The method of claim 8, wherein the one or more types of ligands is selected from a group consisting of RNA, DNA, and protein.

10. The method of claim 6, wherein the target environment is in a cell, and the cell is still living during insertion and removal of the cantilever/tip assembly.

11. The method of claim 9, wherein the protein is a monoclonal or polyclonal antibody.

* * * * *